(12) United States Patent
Hall et al.

(10) Patent No.: US 10,219,454 B2
(45) Date of Patent: Mar. 5, 2019

(54) BIO CELL SYSTEM

(71) Applicants: David R. Hall, Provo, UT (US); David Kelley, Kent, WA (US); Seth Myer, Eagle Mt., UT (US); Joe Fox, Spanish Fork, UT (US)

(72) Inventors: David R. Hall, Provo, UT (US); David Kelley, Kent, WA (US); Seth Myer, Eagle Mt., UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 1 day.

(21) Appl. No.: 15/620,054

(22) Filed: Jun. 12, 2017

(65) Prior Publication Data

US 2018/0352761 A1    Dec. 13, 2018

(51) Int. Cl.
| | |
|---|---|
| *A01G 31/02* | (2006.01) |
| *A01G 31/06* | (2006.01) |
| *A01G 9/02* | (2018.01) |
| *A01G 2/20* | (2018.01) |
| *A01G 9/00* | (2018.01) |
| *A01G 7/02* | (2006.01) |
| *C02F 3/32* | (2006.01) |
| *A01G 9/029* | (2018.01) |
| *A01G 31/00* | (2018.01) |

(52) U.S. Cl.
CPC ............... *A01G 31/02* (2013.01); *A01G 2/20* (2018.02); *A01G 9/028* (2013.01); *A01G 9/029* (2018.02); *A01G 31/06* (2013.01); *A01G 7/02* (2013.01); *A01G 9/00* (2013.01); *A01G 2031/006* (2013.01); *C02F 3/32* (2013.01)

(58) Field of Classification Search
CPC .......... A01G 31/02; A01G 2/20; A01G 9/029; A01G 9/028; A01G 31/06; A01G 2031/006; A01G 9/00; A01G 7/02; A01G 3/32
USPC ........................ 210/602, 612, 614, 615, 631; 47/58.1 LS, 59 R; 119/266; 435/292.1
See application file for complete search history.

(56) References Cited

U.S. PATENT DOCUMENTS

| | | | | |
|---|---|---|---|---|
| 3,854,450 A | * | 12/1974 | Puckett ................ | A01K 63/003 119/248 |
| 4,078,522 A | * | 3/1978 | Akers .................. | A01K 63/006 119/266 |
| 4,952,511 A | * | 8/1990 | Radmer ................ | C12M 21/02 362/340 |
| 5,353,746 A | * | 10/1994 | Del Rosario .......... | A01K 63/06 119/266 |
| 5,647,983 A | * | 7/1997 | Limcaco .............. | A01K 63/003 210/416.2 |

(Continued)

FOREIGN PATENT DOCUMENTS

GB    2226940 A   *   7/1990

*Primary Examiner* — Fred Prince

(57) ABSTRACT

In various example embodiments, a bio cell system is described comprising one or more bio cell units, each comprising a primary tank and one or more secondary tanks, which tanks each comprise side walls, a floor connected to the side walls, and a removable cover. The cover of the tank comprises a lighting system comprising variable output lights and a controller connected to the lighting system comprising code for varying a time period of light output of the lights of the secondary tanks to be out of phase with a time period of light output of the lights of the primary tank.

20 Claims, 11 Drawing Sheets

(56) References Cited

U.S. PATENT DOCUMENTS

| | | | | |
|---|---|---|---|---|
| 5,775,260 A | * | 7/1998 | Jansen | A01K 63/006 119/246 |
| 6,602,703 B2 | * | 8/2003 | Dutil | C12M 21/02 15/104.04 |
| 2012/0309081 A1 | * | 12/2012 | Herzog | C12M 21/02 435/288.7 |
| 2013/0047508 A1 | * | 2/2013 | Toone | A01G 31/02 47/62 R |
| 2014/0208642 A1 | * | 7/2014 | Henman | A01G 9/20 47/19.2 |

* cited by examiner

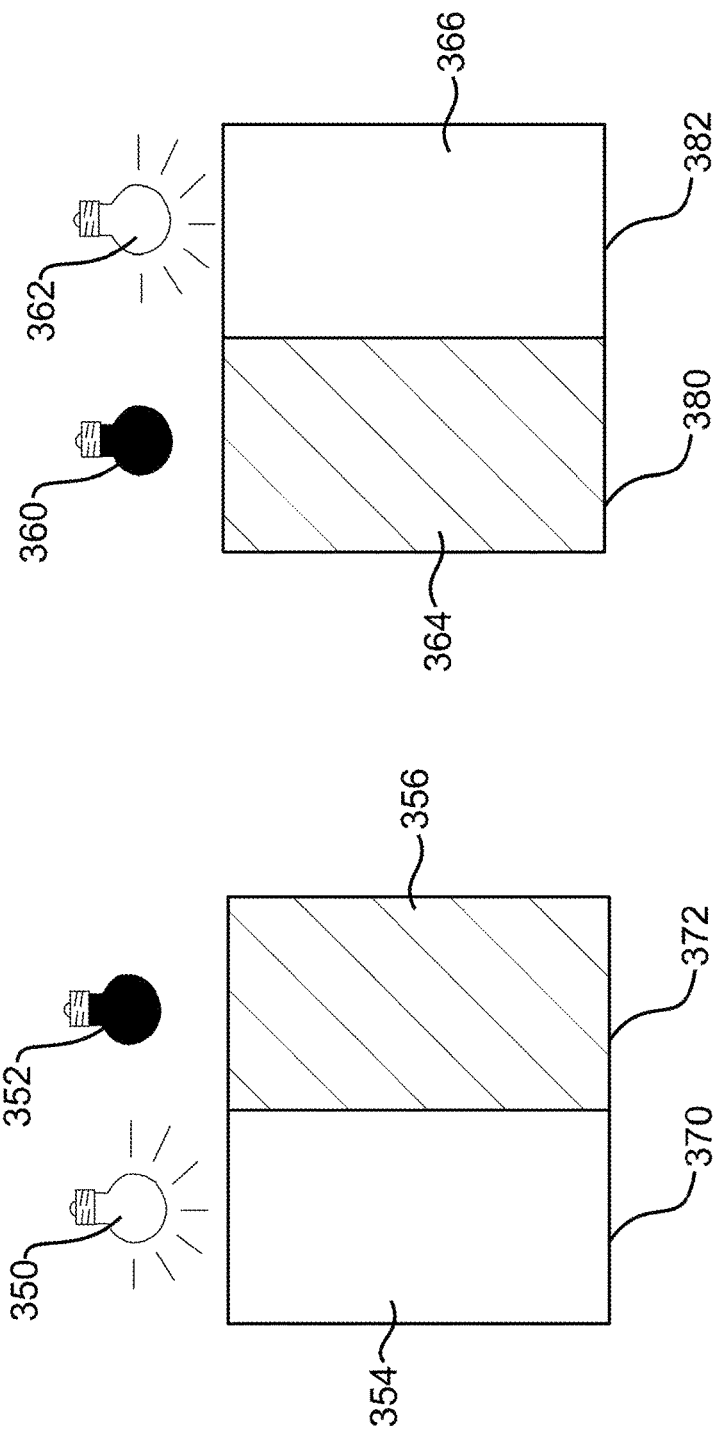

BIO CELL SYSTEM

BACKGROUND

Field of the Invention

This invention generally relates to agriculture and more particularly relates to aquaponics.

Background of the Invention

There are many places in the world which are extremely arid and have a difficult time growing plants and food for their population. Even in climates that are not arid, there is food insecurity and starvation plaguing the world. In response to these problems, it is necessary that a sustainable food source is created. Much of today's food sources are not sustainable and cause damage to the environment. In response to these serious problems, there are aquacultures and hydroponics systems which offer solutions in many respects. Aquacultures involve rearing aquatic animals, often for feeding and has existed for hundreds of years. Aquacultures require maintenance, and feeding of the organisms which may include mollusks, crustaceans, and fish as well as aquatic reptiles, amphibians, and invertebrates, such as echinoderms and jellyfish.

Hydroponics is a method of growing plants without soil. Hydroponic systems use much less water than what would be required to grow plants in soil. The plants need nutrients to grow, and in hydroponic systems a nutrient is put in the water. Aquaponic systems combine the hydroponic system and aquaculture into one sustainable method of food production. In this circulating system, fish waste acts as a natural fertilizer for plants, plants take up those nutrients and return clean water to the fish. Aquaponics provides a sustainable food source for individuals, removes CO2 from the environment, and is beautiful and can be used in design.

Aquaponics solves many problems that aquaculture and hydroponics experience individually. For example, aquaculture tanks become polluted by the fish effluent and produce too much ammonia, because of this, water must be discharged at a rate of 10-20% per day. This means that a lot of water is wasted. It also means that many fish become diseased or get sick because of the dirty water. Hydroponic systems also require a lot of maintenance. Because the plants need nutrients that aren't naturally found in water, they must be mixed and added. The strength of the mixture must be carefully monitored or it may become fatal to the plants. In a hydroponic system, water is discharged because the salts and chemicals build up and become dangerous to the plants. Similar to the aquaculture, the hydronic system wastes a lot of water. Aquaponics systems solve many of these problems. In an aquaponics system, water doesn't need to be discharged, and disease among fish is very rare. Combining aquaculture and hydroponics creates a symbiotic environment. The fish effluent is broken down into nitrates which is then used by plants for nutrients. There are three living organisms in an aquaponic system—fish, plants, and bacteria. The bacteria break down the fish byproducts first into nitrites and then nitrates.

Often plants that aren't high in nutrients grow best in aquaponic systems. Lettuce and Chinese cabbage for example. Plants often found in salads, such as cucumbers, tomatoes, chives, also grow well in aquaponic systems. Most large Aquaponics systems are outside. There are two ways to grow plants in aquaponic systems. The first is called rafts, where plants are placed in foam rafts and their roots dangle down into the water. Media based aquaponics involves placing plants in planting media (often gravel, or clay pellets). These pellets act as a filtration system.

Aeroponics, like Aquaponics and hydroponics, is growing plants without soil, but nurturing them through the air or mist. It may be considered a type of hydroponics since the roots are sprayed with a nutrient rich mist. An advantage of aeroponics is that it is much harder for diseases to spread because there is no soil and the plants have almost no contact.

SUMMARY

This invention has been developed in response to the present state of the art and, particularly, in response to the problems and needs in the art that have not yet been fully solved by currently available systems and methods. Features and advantages of different embodiments of the invention will become more fully apparent from the following description and appended claims, or may be learned by practice of the invention as set forth hereinafter.

Consistent with the foregoing, a bio cell system is disclosed. The bio cell system is a modular aquaponics system, with advanced lighting for indoor growing. It is created to service people. The fish and plants that are cultivated in the bio cell system can be eaten. The bio cell system services a variety of fish and a large variety of plants too. The bacteria that are part of the system break down the fish feces (ammonia) so that it turns into nitrites and then nitrates which are the nutrients used by the plants. An important application of the bio cell system is that it is a self-sustaining food source. It can be placed in homes or apartments, workplaces, stores, schools, on a farm, or in a business. It may help individuals to be less dependent on purchasing food. If any situation arose wherein access to food was limited, such as a natural disaster, the bio cell system offers an alternative source of food.

One of the key functions of the bio cell system is to adjust the inputs and outputs of each unit within the system to maintain a balanced system. A controller monitors, via sensors, all conditions within the ecosystem, and adjusts the inputs and outputs to maintain pH levels, CO2 levels and providing adjustment of and control of the nitrogen cycle. Because it is a closed system, the environmental conditions may be controlled including temperature, humidity levels, CO2, pH, fluid flow along with rate and volume of material inputs and outputs. Inputs and outputs may comprise composting, trace minerals, fluid, plants, fish, and species of plant and animals.

The bio cell system adjusts the lighting in each unit to be out of phase with adjacent connected units. This provides a balancing of the pH in the connected units by having some units in the dark while other units are in the light. The lighted units' higher pH levels are equalized and balanced by the lower pH levels in the darkened units. The timing and control of the lighting in each unit is carried out by the controller.

The bio cell system is also a good teaching tool and can be used in schools or elsewhere to teach students and others about ecological systems in a hands-on environment. Because the bio cell system can be configured to include hundreds of bio cells and can grow a large variety of plants, it is able to feed people on a large scale. But because of its configurability, it can also exist with only a few cells and can be adjusted to feeding smaller quantities.

Current aquaponics systems are often placed outdoors to use the natural sunlight so that plants can grow. A special lighting configuration is needed so that on a large scale, aquaponics can be used indoors. When put indoors, the bio cell system can be more easily accessed and is decorative as well. The bio cell system is unique because it can include hundreds and thousands of bio cell units to feed hundreds or thousands of people. The bio cell system is a modular system. Each individual bio cell unit is programmed to work together with other bio cell units to balance each other and provide the necessary inputs for each other to create a balanced ecosystem.

Aquaponic systems, while self-sustaining (except for some water which evaporates and needs to be replaced) still need some power source to pump the water through the system. The bio cell uses electricity or solar power to pump water. It may use only solar panels to generate the energy needed to pump the water, making it extremely efficient. This feature may be advantageous when considering the cost of the bio cell Aquaponics system. However, in areas or times of year when there is not sufficient sunlight to power the bio cell Aquaponics system on its own, electricity may be used solely or in conjunction with the solar panels to power the bio cell Aquaponics system. There may also be methods of storing energy to power the system. These methods may include batteries or any other method of storing energy that is used subsequently.

The plants in the bio cell modular Aquaponics system can be grown in a variety of medias. There are benefits to using different aquaponic systems for plants. Some plants grow better in media based aquaponic systems, such as larger or fruiting plants. This is because the fish feces that is filtered by the media is broken down and the plants get more nutrients. Raft beds are more efficient for growing leafy greens such as lettuce. A system which uses both methods of growing is superior to meet the needs of different types of plants. The bio cell uses both types of media to suit many types of plants. Different systems are in different bio cells so that plants will be most successful and can grow best and provide the best quality produce possible. In the bio cell modular aquaponic system, different cells are designed to fit the needs of all the organisms that are living in the entire system.

Although the bio cell is self sustaining, some maintenance is required to keep the bio cell's ecological system in balance. For this purpose, there are sensors in the bio cells that measure various components. The sensors and controls may integrate one or many cubes into large composite biotopic networks designed to work with the cloud and automated system to control and monitor all aspects of biochemistry primarily, which is managed through the biological nitrogen cycle, PH, trace element and temperature controls all of which can be managed by a controller and sent to a cloud based data management system. By managing the system through the cloud, users of the bio cell can monitor it at their convenience and make necessary adjustments easily and without being near the bio cell unit or units.

Each of the bio cells may play a key role in the ecosystem that it involves. Those roles are varied and all important in contributing to the overall balance and success of the larger, incorporated ecosystem. The different bio cells allow for different plants and fish to thrive to create a more diverse crop. For example, the fish loaded deep water cell type is especially designed for fish. A closed box system cell. The bio cell is designed to support a large of amount and variety of plants and animal. Fish such as tilapia, blue gill/brim sunfish crappie koi, fancy goldfish, paco, ornamental fish such as angelfish, guppies, tetras, swordfish, mollies, carp, barramundi, silver perch, golden perch, yellow perch, Catfish, Large mouth Bass can all live in the bio cell system.

Other organisms that can or may live in the Aquaponics system are any leafy lettuce, pak choi, kale, swiss chard, arugula, basil, mint, watercress, chives, most common house plants, tomatoes, peppers, cucumbers, beans, peas, squash, broccoli, cauliflower, cabbage, bananas, dwarf citrus trees: lemons, limes and oranges, dwarf pomegranate tree, sweet corn, micro greens, beets, radishes, carrots, onions, edible flowers: nasturtium, violas, orchids. Crucial to the success of the Aquaponics system is of course the bacteria. The bacteria, as will be explained later, is crucial in the nitrogen cycle. Any nitrifying bacteria can be used in the Aquaponics system, but the most common threads include species of the genera *Nitrosomonas, Nitrosococcus, Nitrobacter* and *Nitrococcus*.

The nitrate cycle is extremely important in an Aquaponics system. It is the backbone of the Aquaponics system, and allows sustainability within the system. This is also where all the organisms come to affect one another in the Aquaponics system. The nitrate cycle begins with the effluent of the fish. Ammonia is introduced into the tank as fish effluent, and the nitrifying bacteria converts the ammonia first into nitrite and then into nitrate. Ammonia and nitrite are toxic to fish and will kill them if they are not removed from the tank. The bacteria consume the ammonia, and creates a byproduct—nitrate. Another bacterium then consumes the nitrite (which is still toxic to the fish, although less so) and converts the nitrite into a nitrate. With the proper bacteria, the cycle is supported and when the nitrate is produced, the plants absorb it. This cycle keeps balance in the bio cell. Because the water in the system is kept clean as the fish, plants, and bacteria work together in harmony, the replacement rate of water is low. However, some water is evaporated and so some water replacement is necessary.

Aeroponics, like hydroponics, is a method of growing plants without soil, and involves misting water which is nutrient rich so that it feeds dangling plant roots. Plants are hung and there roots dangle freely, and the mist then nourishes them. In the bio cell modular Aquaponics system, some bio cells may be devoted to an aeroponic system.

Composting is also supported in the bio cell system. That is to say compost can be used to supply nutrients to the ecosystem. Outputs of the system include fish food, fish live stock, and many other crops.

Different animals and plants need different cycles of light. The bio cell system further comprises lighting in each of the cells that is controlled by the controller to meet the specific needs of a particular species. Temperature and CO2 levels are measured by the sensors and controlled by the controller. Adjustments to the pH levels, CO2 levels and Nitrogen cycle are adjusted and modified by adding trace minerals, water and other required components as required for the specific animals or plants supported in each cell.

In an embodiment, the bio cell system includes one or more bio cell units, each bio cell unit consisting of a primary tank with side walls, a floor connected to the side walls, and a removable cover, and one or more secondary tanks, each comprising side walls, a floor connected to the side walls, and a removable cover. The cover has a lighting system with variable output LED lights. The bio cell system also includes one or more pumps and piping, one or more sensors and a controller connected to the lighting system comprising code for varying a time of day output of the LED lights of the secondary tanks to be out of phase with a time of day output of the LED lights of the primary tank.

In a certain embodiment, the bio cell system further includes one or more solar power modules for supplying electrical power to the system. In another embodiment, it further includes one or more electrical energy storage modules for storing and supplying electrical power to the system, the electrical storage energy modules may store energy in electrochemical devices such as batteries, or may be capacitors.

In another embodiment, the bio cell system includes two or more living organisms of fish, plants, and bacteria. In an embodiment, the plants grow in one or more of the following: media based system, float based system, or a hybrid system.

In an embodiment, each bio cell is configured as one or more of the following: biotopic aquaria, biotopic aquaria aquaculture, fish loaded deep-water cell, bio reactor, media based deep water culture, mist based deep water culture, closed box system, open box system, composter, worm harvester, small plant fish food production cube, fish and float system, salt or fresh water. In another embodiment, the bio cell system includes a biofilter module comprising a solids removal means, the biofilter module further including a biological waste digestion unit for digesting solids from the solids removal means to produce plant nutrients. In an embodiment, the biological waste digestion unit includes a biological species that at least partially digests solid waste from the solids removal means to produce plant nutrients, and the biofilter module receives a waste stream comprising solid waste and fluid from the one or more tanks;

In an embodiment, each bio cell unit operates as its own ecosystem. In another embodiment, composting is produced as an output of the system. In an embodiment, fish food is produced as an output of the system. In certain embodiments, the system further comprises water cycle management. In another embodiment, the system further includes multi cycle support for maintaining dual night day cycles and fry hatching support.

In certain embodiments, a bio cell is configured to mist plants roots. In another embodiment, the bio cell system monitors CO2 levels, PH levels, trace elements and temperature within the system via the controller and the sensors, wherein one of the one or more sensors is a CO2 sensor, PH level sensor, trace elements sensor or a temperature sensor. In an embodiment, the system controller provides control of the system based on user interface, pre-programmed data and data from the sensors.

In an embodiment, the system further includes one or more electric heaters. In another embodiment, the controllers in the one or more bio cell units are controlled via the cloud. In certain embodiments, the system self-manages and adjusts levels based on pre-programmed data, sensor data and user input. In an embodiment, the one or more bio cell units are modular and configured via the controller to additional bio cell units. In another embodiment, the tank shape is of one or more of the following: square, rectangular, oval, circle, triangle, star, cylindrical.

In certain embodiments, the variable output lights include LED lights producing full-spectrum light, matching the wavelength and color of sunlight. In another embodiment, the variable output lights comprise LED lights producing light matching the wavelength and color of moonlight.

In an embodiment, the system monitors and controls the amount of water in the system, and filters out impurities from the water. The system also brings in fresh water as an input.

In certain embodiments, each bio cell unit operates as its own ecosystem. In another embodiment, composting and fish food are produced as outputs of the system. In another embodiment, composting is an input to the system. Trace minerals and other required nutrients are derived from the composting material. In an embodiment, the system further includes water cycle management. In an embodiment, the system further includes multi cycle support for maintaining dual night day cycles and fry hatching support.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 3D and 3E illustrate two connected bio cell units with different lighting conditions, according to an example embodiment.

DETAILED DESCRIPTION OF THE DRAWINGS

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In various embodiments, a system as described herein creates an ecosystem.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Figure 1:
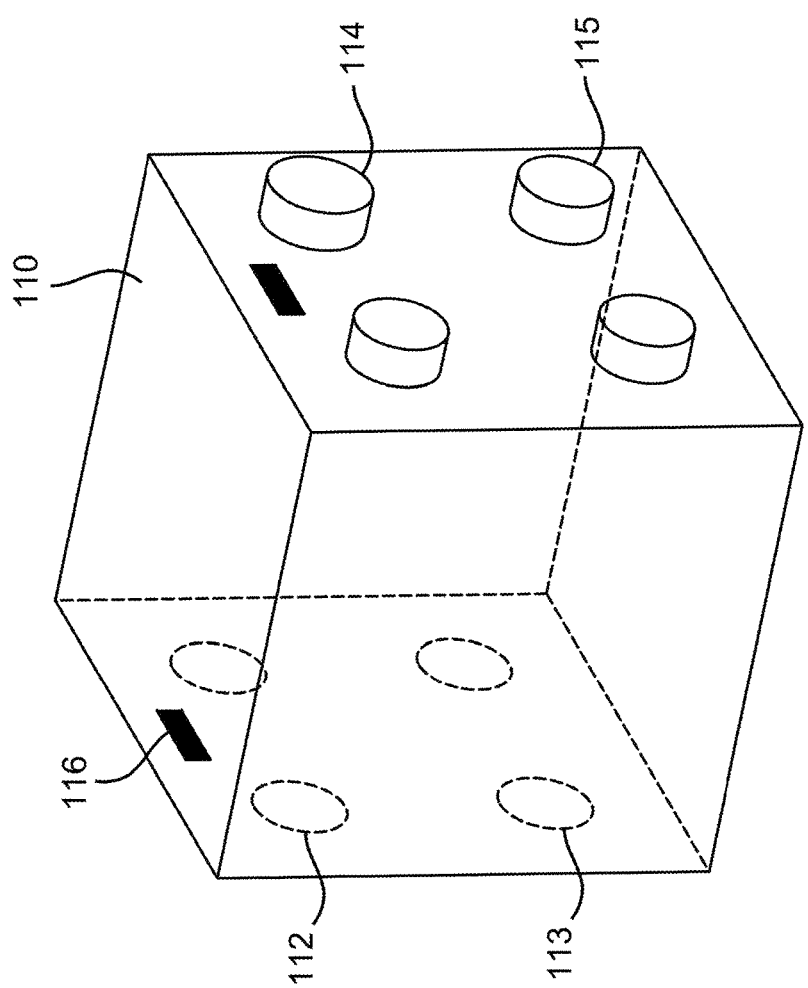
FIG. 1 is an isometric view of a bio cell unit, according to an example embodiment.

FIG. 1 is an isometric view of a bio cell unit. In one embodiment, the bio cell unit 110 is cube shaped and has handles 116 on either side for easier transportation. Connectors in the form of extruded plugs 114 and 115 plug into connectors in the form of receptacles of an adjacent bio cell unit. Receptacles 112 and 113 connect to plugs of an additional bio cell unit. If necessary, the bio cell unit may be shaped as a rectangle or any other shape to accommodate a space or the contents of the bio cell unit.

Figure 2A:
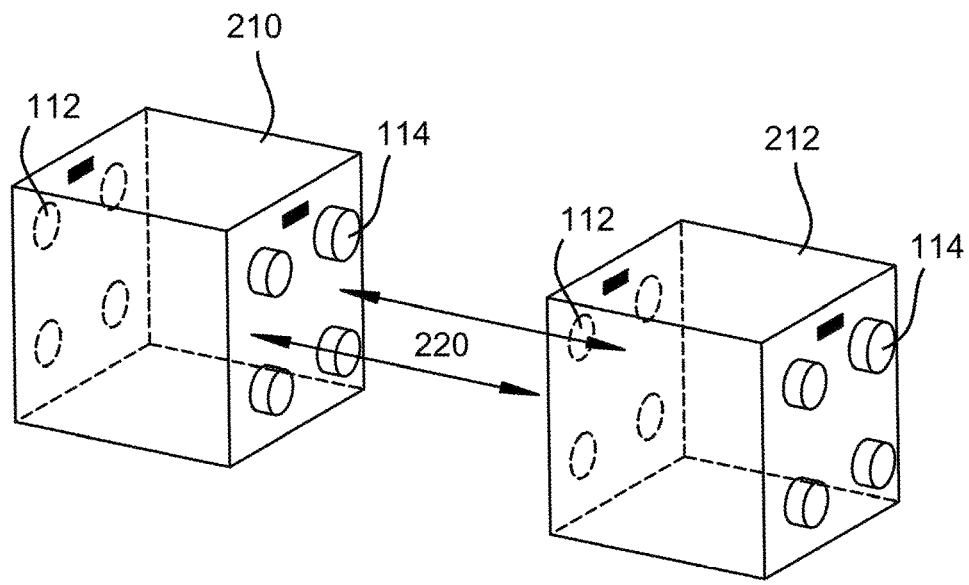
FIG. 2A is an isometric view of two adjacent bio cell units that are not connected together, according to an example embodiment.

FIG. 2A is an isometric view of two adjacent bio cell units that are not connected together. A first bio cell unit 210 is configured to connect to a second bio cell unit 212. Arrows 220 depict how the two bio cell units align in order to connect the plugs 114 of bio cell unit 210 to receptacles 112 of bio cell unit 212.

Figure 2B:
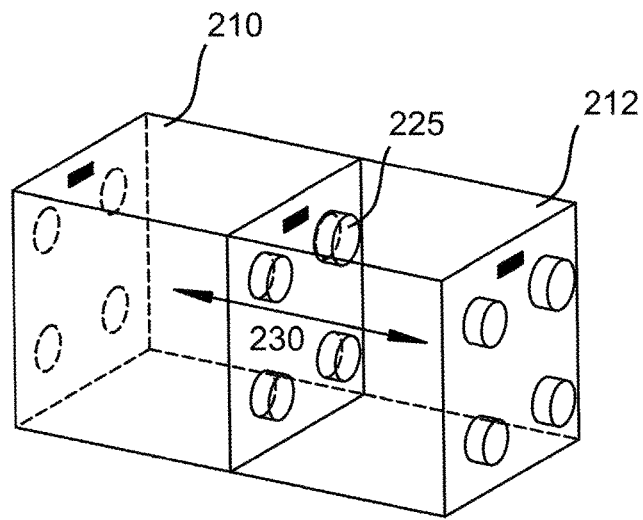
FIG. 2B is an isometric view of two bio cell units that are connected together, according to an example embodiment.

FIG. 2B is an isometric view of two bio cell units that are connected together. The first bio cell unit 210 is connected to the second bio cell unit 212. The connections 225 between the two bio cell units are fully engaged, and allow fluid to flow between the two bio cell units as shown by arrows 230.

Figure 3C:
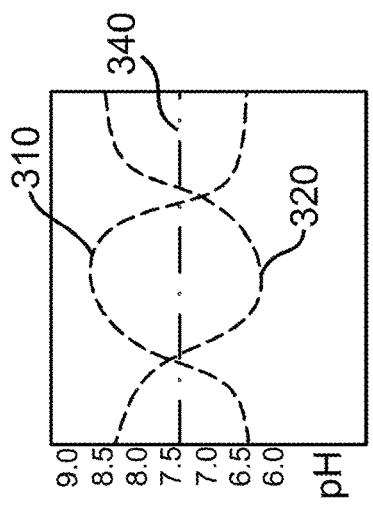
FIGS. 3A, 3B and 3C are graphs showing the variance of pH levels within a bio cell unit over a period of time, according to an example embodiment.
Figure 3B:
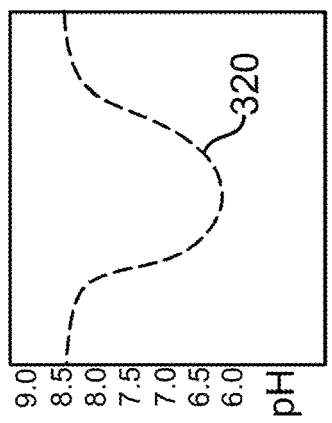
Figure 3A:
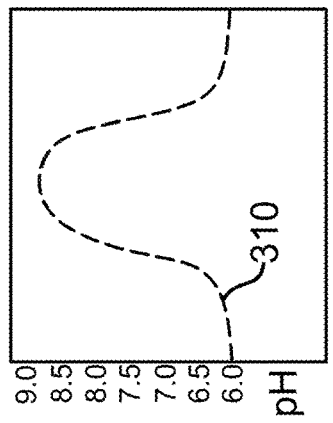

FIGS. 3A, 3B and 3C are graphs showing the variance of pH levels within a bio cell unit over a period of time.

FIG. 3A is a graph of pH levels in a first bio cell unit during a daytime period. During this time period, the pH levels increase.

FIG. 3B is a graph of pH levels in a second bio cell unit during a night-time period. During this time period, the pH levels decrease.

Neither of these conditions (low pH or high pH) are ideal for the nurturing and growth of plants, fish or other living things. Ideally the pH should be kept within a range that is not too high or too low for ideal growth and health of the species being supported. By adjusting the lighting to be out of phase between two bio cells that are connected together, the high pH (daytime) of a first bio cell unit is offset by the low pH (night-time) of a second bio cell unit.

FIG. 3C is a graph of pH levels of two connected bio cell units. The two bio cell units are simultaneously exposed to day time conditions (the first unit) along with night-time (the second unit). High pH curve 310 from the first bio cell unit is depicted for day time conditions. Lighting is on for the first bio cell unit. Low pH curve 320 from the second bio cell unit is depicted for night-time conditions. Lighting is turned off for the second bio cell unit. During the same time period shown, both bio cell units are under different conditions. One unit is experiencing day time conditions, while the second unit experiences night-time conditions. Since they are connected together, the pH levels are brought to equilibrium as shown by pH curve 340.

FIGS. 3D and 3E illustrate two connected bio cell units with different lighting conditions.

FIG. 3D depicts a first time period, wherein a first bio cell unit 370 is connected to a second bio cell unit 372. Light 350 illuminates space 354 within the first bio cell unit 370. The second bio cell unit 372 has a light 352 that is turned off. The space 356 within the unit is dark. During this time period shown, the first bio cell unit is providing an active growth environment (day), and the second bio cell unit is at rest (night).

FIG. 3E depicts a second time period, wherein a first bio cell unit 380 is connected to a second bio cell unit 382. Light 362 illuminates space 366 within the second bio cell unit 382. The first bio cell unit 380 has a light 360 that is turned off. The space 364 within the first bio cell 380 is dark. During the second time period shown, the second bio cell unit is providing an active growth environment (day), and the first bio cell unit is at rest (night).

Figure 4A:
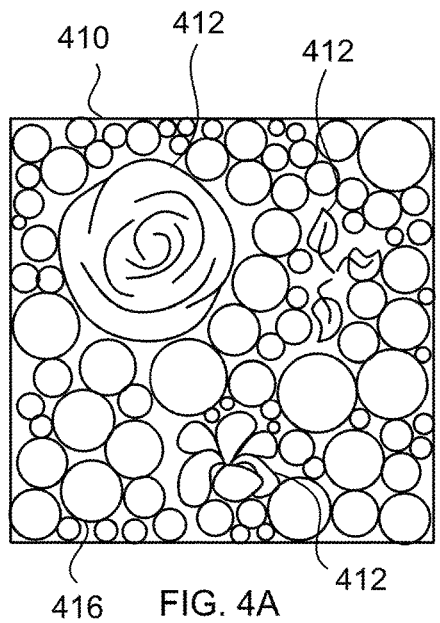
FIG. 4A is an illustration of the top view of a media based bio cell, according to an example embodiment.

FIG. 4A is an illustration of the top view of a media based bio cell 410, wherein the various plants 412 are growing through a media 416. The media 416 in FIG. 4A may be gravel or clay pellets. There are many different types of plants that may grow within this configuration.

Figure 4B:
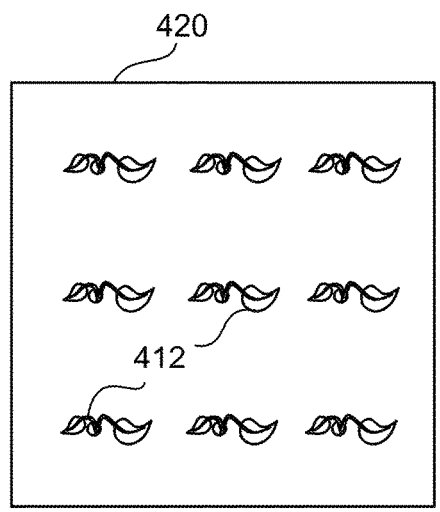
FIG. 4B is also an illustration of the top view of a raft based bio cell, according to an example embodiment.

FIG. 4B is also an illustration of the top view of a raft based bio cell 420 with plants 412 as shown. Various configurations may be executed, which include fewer or more slots for plants to grow through. For example, the bio cell raft may be comprised of three rows each with three openings for plants.

Figure 4C:
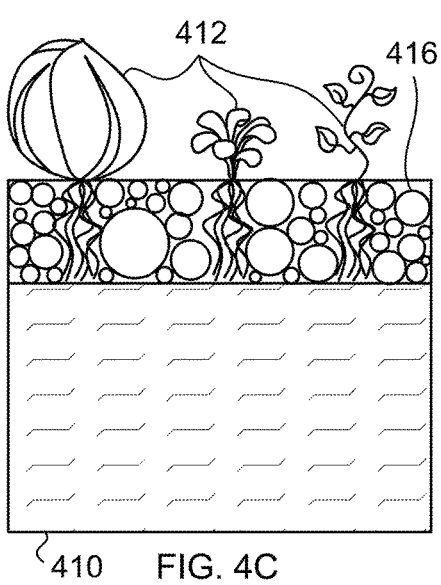
FIG. 4C is a side view of a media based bio cell, according to an example embodiment.

FIG. 4C is a side view of a media based bio cell 410. The plants 412 have roots that extend into the media 416 as shown.

Figure 4D:
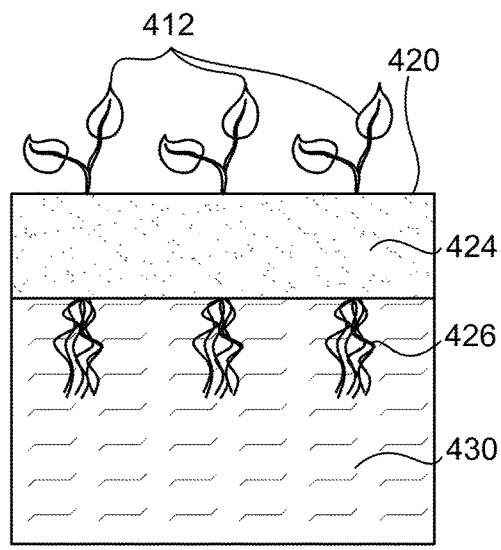
FIG. 4D is a side view of raft based bio cell, according to an example embodiment.

FIG. 4D is a side view of raft based bio cell. The raft material 424 provides a floating platform for the plants 412. Here it is clear how the roots 426 of the plants dangle freely into the water 430 in the bio cell. The plants 412 receive the needed nutrients from the water.

Figure 5:
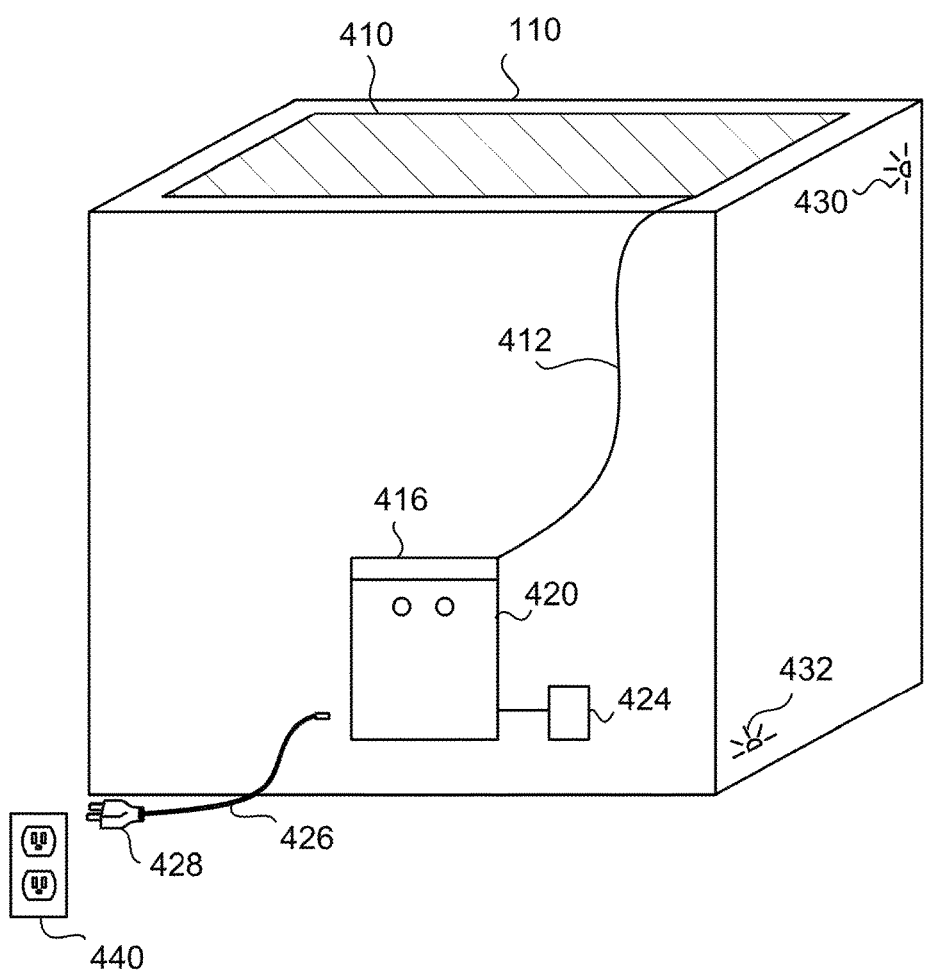
FIG. 5 is an illustration of the electrical and control system of a bio cell unit, according to an example embodiment.

FIG. 5 is an illustration of the electrical and control system of a bio cell. In the embodiment shown in this example, the bio cell unit 110 is equipped with a solar photovoltaic module 410 that is mounted on the top of the bio cell unit. Electrical wiring 412 connects to DC power supply 420 via charge controller 416. Controller 424 is connected to the power supply 420. The power supply 420 comprises energy storage devices which may comprise batteries or capacitors. Sensors 430 and 432 inside the bio cell unit 110 communicate sensor data to the controller 424. An additional charging system may also supply DC power to the power supply 420 by an AC to DC converter 428 which is plugged into AC receptacle 440. Cable 426 may be plugged into power supply 420 to provide charging to the battery in cases where AC power is available. In cases where AC power is not available, the solar photovoltaic module 410 keeps the batteries 420 charged and provides power to the system. The controller 424 monitors and controls all systems and processes within the bio cell system. Each bio cell unit may have sensors, control valves for fluid input and fluid output, input hoppers for feeding in required trace minerals and other required system adjustment materials and components. By monitoring all system conditions within each bio cell unit, the controller may adjust lighting, temperature via heaters or coolers, input and outputs including flows of fluids in order to maintain pH levels and adjust and control the nitrogen cycle. The controller 424 monitors and controls each bio cell unit and also monitors and controls the bio cell system as a whole. Adjustments are made locally at each individual bio cell unit, and globally across the network of multiple bio cell units. As the system grows in size and numbers of bio cell units, the controllers are networked together in order to expand the size and scope of the network. The network may also be the cloud wherein the controllers communicate with the cloud network for monitoring and control. In this embodiment, the user may use a mobile device such as a cell phone or tablet as a user interface to the system. The master control for the system may be within the cloud.

Figure 6:
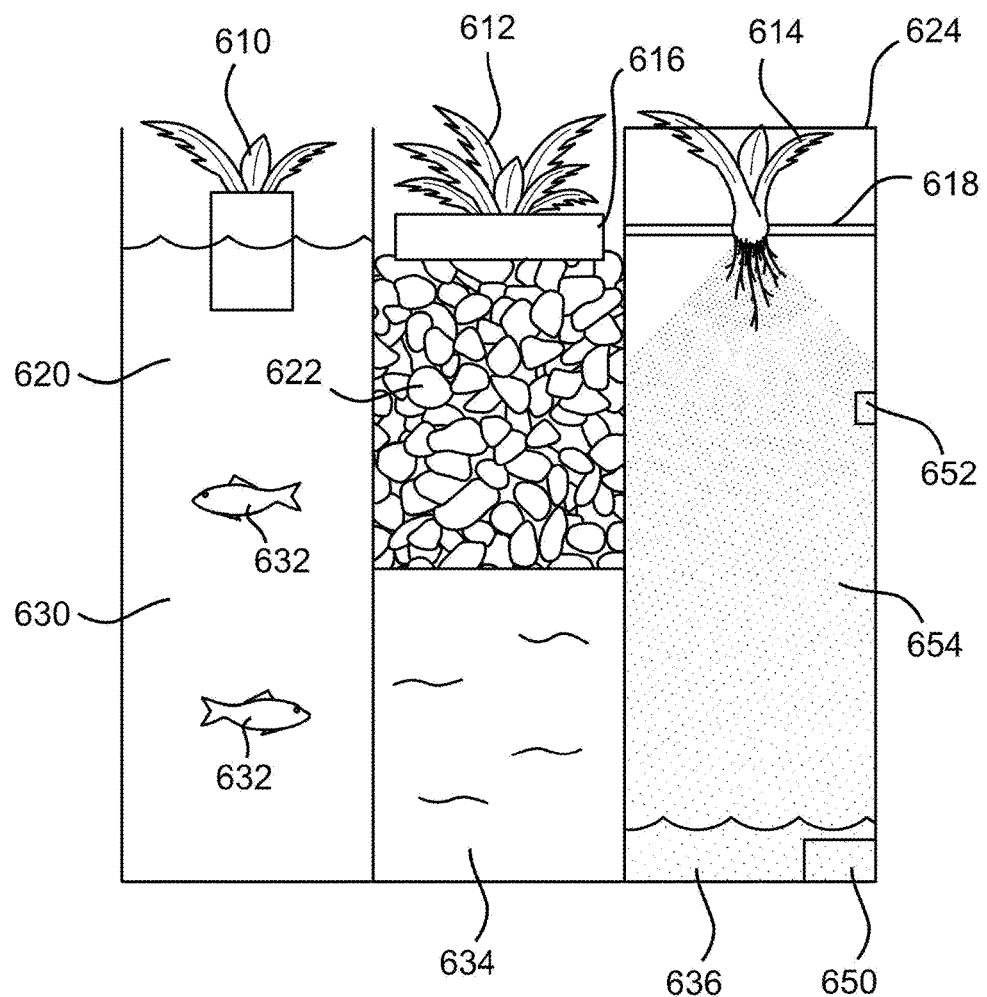
FIG. 6 depicts a bio cell unit split into three sections, according to an example embodiment.

FIG. 6 depicts a bio cell unit split into three sections. The first section 620, illustrates the fish 632 within the water 630 which could be tilapia or another fish, and a plant 610 growing above it. The second section 622, demonstrates a media based growing plant 612 on a support platform 616 with water 634 as shown. The third section 624, represents aeroponics. Here the water 636 is evaporated and converted to a nutrient-rich mist 654 which fills the air to nourish plant 614. Atomizer 650 converts the water 636 to a fine mist at the base of the unit, and alternatively sprayer 652 may create a mist near the top of the section 624. Because a bio cell has the ability to create its own ecosystem, even a single bio cell can be split such as show in FIG. 6.

Figure 7:
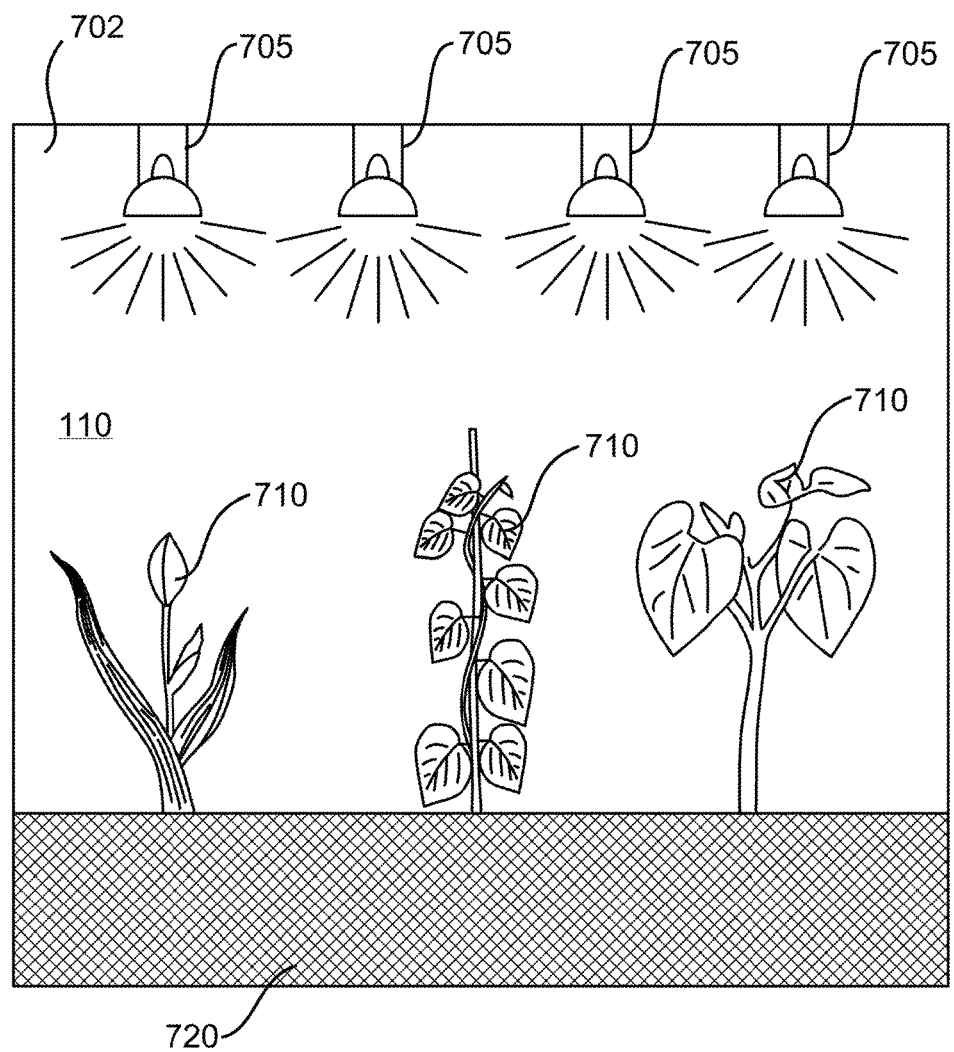
FIG. 7 is an illustration of a bio cell unit with lighting at the top and plants growing inside, according to an example embodiment.

FIG. 7 is an illustration of a bio cell unit with lighting at the top and plants growing inside. The cover 702 in FIG. 7 comprises a lighting system comprising variable output LED lights 705. The lights 705, nourish the plants 710 growing in the bio cell unit. Media 720 at the base of the bio cell unit 110 includes water and nourishment as required. Each of the lights 705 may be controlled separately by the controller as required to maintain the required amount and type of lighting best suited for the particular plants species being served. The cycling on and off, light intensity, color, temperature and sequencing may be controlled by the controller.

Figure 8:
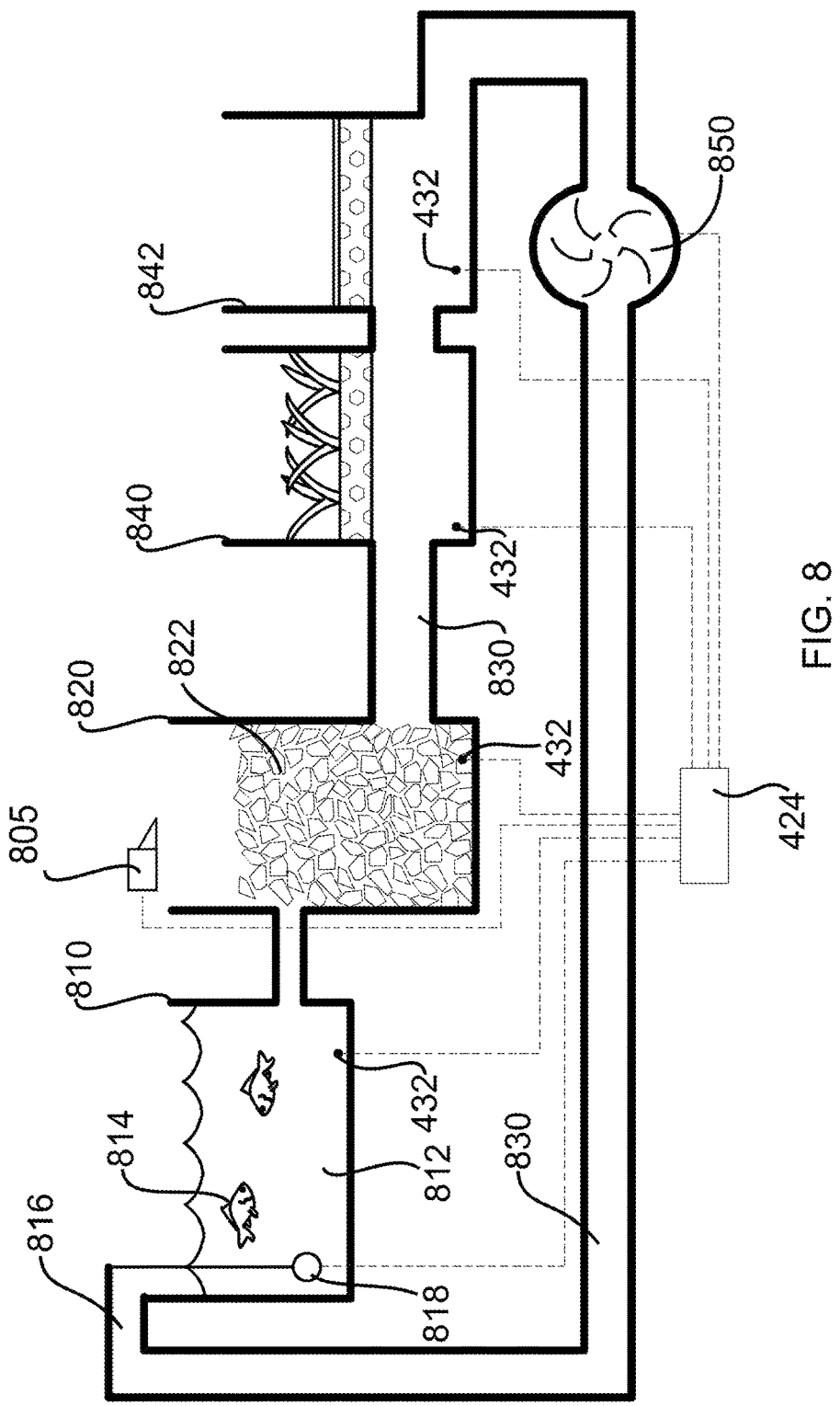
FIG. 8 depicts the bio cell process on a larger scale, with various bio cells of various shapes connected together, according to an example embodiment.

FIG. 8 depicts the bio cell process on a larger scale, with various bio cells of various shapes connected together. Fluid 816 entering bio cell unit 810 is controlled at entrance point 818 by controller 424. Additional fresh water is brought into the system at entrance point 818. Entrance point 818 may comprise one or more valves. One or more pumps may be included in addition to pump 850 in order to supply fresh water to the system and to control flows of fluid between tanks and other system components as required. Nutrient rich fluid 812 is provided to fish 814. Sensors 432 monitor conditions within bio cell unit 810. The fluid then flows to pre-filter bio media unit 820 which comprises media 822 as required to filter and adjust the composition of the fluid. Composting material may be added to this unit along with bacteria and other systems as required to make adjustments to the fluid. Sensors 432 are connected to controller 424. Hopper feeder 805 is controlled by controller 424 and feeds in required trace minerals, composting materials and other components as required for the system. One or more feeders may be provided as necessary for a variety of material and component types. Fresh water or fluid may be added to the system as required to maintain required fluid levels.

As shown in FIG. 8, piping 830 is provided to connect the units together and provides a pathway for the fluid to be pumped throughout the system via pump 850. Units 840 and 842 are supplied by the treated and enhanced fluid form the output of pre-filter bio media unit 820 via piping 830. Units 840 and 842 also have sensors 432 as shown.

Figure 9:
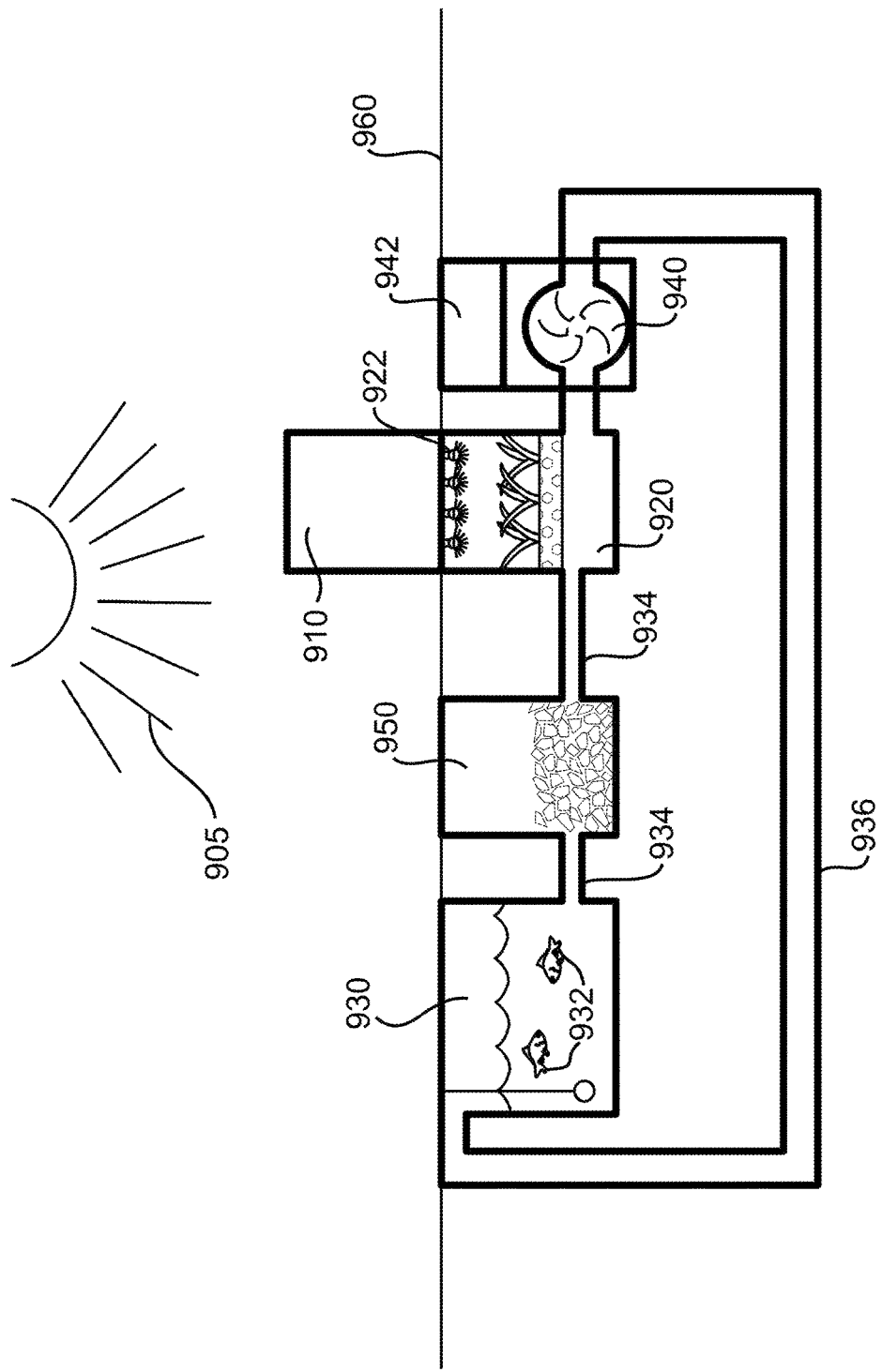
FIG. 9 depicts the bio cell process as implemented in an underground system, according to an example embodiment.

FIG. 9 depicts the bio cell process as implemented in an underground system. Only one bio cell unit 910 is above ground in this example embodiment. In this example, unit 910 is the primary unit and all other units are secondary. Sunlight 905 provides the required lighting in this example. No LED lighting is provided in unit 910. Bio cell unit 920 is underground with the rest of the system. Lighting 922 in unit 920 is cycled on during night-time hours in order to balance the pH levels with unit 910 above. Since the lighting cycle of unit 910 cannot be controlled, the sensors in both units 910 and 920 monitor the conditions of both units and adjust the lighting in 920 as required to adapt to the changing nature of sun light and cloudy conditions experienced by unit 910.

Ground level 960 is shown in FIG. 9, and all other system modules and components are underground as shown (other than unit 910). By placing the system underground, the added heating and cooling benefits of the earth may be realized. Pump 940 is accessible by removing an insulated cover 942. Piping 934 connects units 930, 950 and 910 together. Fish 932 are shown in unit 930, and unit 930 is supplied by fluid pumped in via piping 936 from pump 940.

Figure 10:
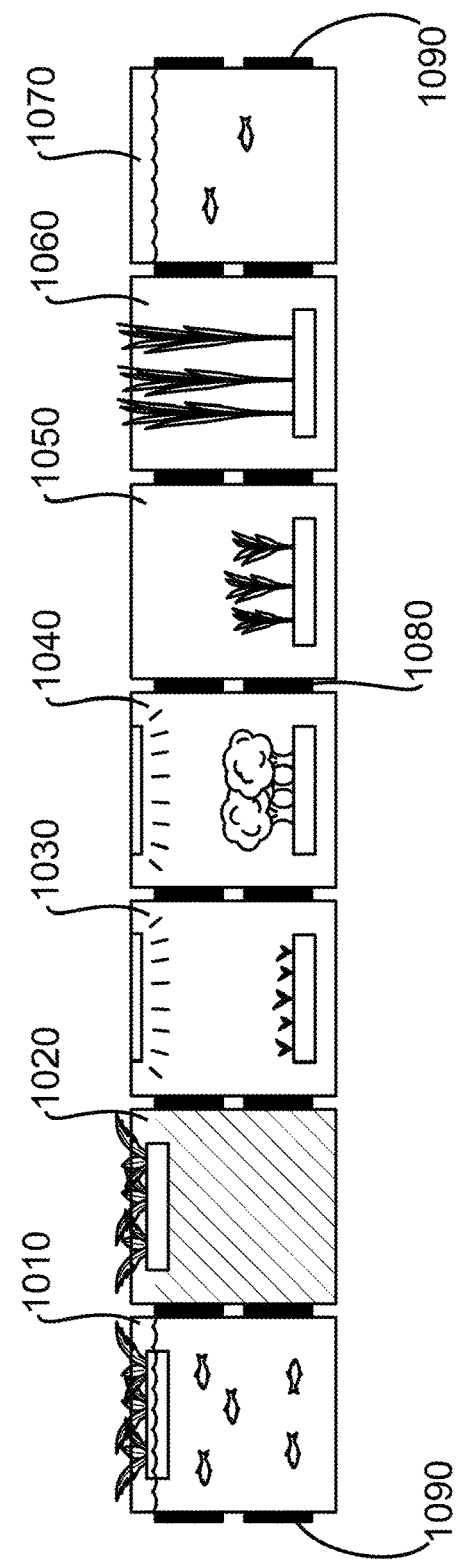
FIG. 10 illustrates seven bio cell units connected together, according to an example embodiment.

FIG. 10 illustrates seven bio cell units connected together. Units 1010, 1020, 1030, 1040, 1050, 1060 and 1070 are connected in series in this example embodiment. Connectors 1080 provide a pathway between each of the units for fluid flow between units. Connectors 1090 on the exposed ends of the units are protected by a cap which seals and protects these openings from intrusion of water or the elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A bio cell system comprising:
one or more bio cell units, each bio cell unit comprising:
a primary tank comprising side walls, a floor connected to the side walls, and a removable cover;
one or more secondary tanks, each comprising side walls, a floor connected to the side walls, and a removable cover;
the primary tank and the secondary tanks further comprising connectors allowing fluid transfer between the primary tank and the secondary tanks;
the cover comprising a lighting system comprising variable output lights;
one or more pumps and pipes;
one or more pH level sensors for each of the primary tanks and the secondary tanks; and
a controller connected to the pH level sensors and the lighting system comprising code for varying a time period of light output of the lights in the secondary tanks to be out of phase with a time period of light output of the lights in the primary tank, as a result of information from the pH level sensors, thereby balancing high pH levels of lighted tanks with low pH levels of darkened tanks.

2. The bio cell system of claim 1, wherein the bio cell unit further comprises one or more solar photovoltaic power modules for supplying electrical power to the bio cell unit.

3. The bio cell system of claim 1, wherein the bio cell unit further comprises one or more electrical energy storage modules for storing and supplying electrical power to the system.

4. The bio cell system of claim 3, wherein the electrical storage energy modules comprise one or more of batteries and capacitors.

5. The bio cell system of claim 1, wherein the bio cell unit further comprises two or more living organisms of fish, plants, and bacteria.

6. The bio cell system of claim 5, wherein the bio cell unit further comprises one or more of a media based system, a float based system, or a hybrid system.

7. The bio cell system of claim 1, wherein each bio cell houses one or more biotopic aquaria, biotopic aquaria aquaculture, fish loaded deep-water cell, bio reactor, media based deep water culture, mist based deep water culture, closed box system, open box system, composter, worm harvester, small plant fish food production cube, fish and float system, salt water, and fresh water.

8. The bio cell system of claim 1, wherein each bio cell further comprises a biofilter module which receives a waste stream from the one or more tanks, the biofilter module comprising a solids removal means and a biological waste digestion unit.

9. The bio cell system of claim 1, wherein the variable output lights comprise LED lights producing full-spectrum light, matching the wavelength and color of sunlight.

10. The bio cell system of claim 1, wherein the variable output lights comprise LED lights producing partial-spectrum light matching the wavelength and color of moonlight.

11. The bio cell system of claim 1, wherein the controller monitors and controls the amount of water in the system and filters out impurities from the water.

12. The bio cell system of claim 11, wherein the controller adds fresh water to the bio cell.

13. The bio cell system of claim 1, wherein the bio cell unit comprises a mister to moisten roots of plants.

14. The bio cell system of claim 1, wherein the bio cell unit comprises $CO_2$ sensors, pH level sensors, trace elements sensors, and temperature sensors.

15. The bio cell system of claim 14, wherein the controller monitors and adjusts the conditions within the bio cell unit based on user interface, pre-programmed data, and data from the sensors.

16. The bio cell system of claim 1, wherein the bio cell unit further comprises one or more electric heaters.

17. The bio cell system of claim 1, wherein the controller is actuated remotely through a cloud based network.

18. The bio cell system of claim 1, wherein the bio cell unit self-manages and adjusts the conditions within the bio cell unit based on pre-programmed data, sensor data and user input.

19. The bio cell system of claim 1, wherein the controller connects the bio cell unit to additional bio cell units.

20. The system of claim 1, wherein the controller is connected to controllers of additional bio cell units.

* * * * *